United States Patent
Isono et al.

(10) Patent No.: US 7,703,303 B2
(45) Date of Patent: Apr. 27, 2010

(54) MAGNETIC DISK GLASS SUBSTRATE MANUFACTURING METHOD

(75) Inventors: Hideki Isono, Tokyo (JP); Shinji Eda, Tokyo (JP); Kazuhiko Maeda, Tokyo (JP); Naohiro Kamiya, Tokyo (JP); Nobuyuki Eto, Tokyo (JP)

(73) Assignee: Hoya Corporation, Tokyo (JP)

( * ) Notice: Subject to any disclaimer, the term of this patent is extended or adjusted under 35 U.S.C. 154(b) by 769 days.

(21) Appl. No.: 11/078,324

(22) Filed: Mar. 14, 2005

(65) Prior Publication Data

US 2005/0284179 A1    Dec. 29, 2005

Related U.S. Application Data

(60) Provisional application No. 60/552,213, filed on Mar. 12, 2004.

(51) Int. Cl.
*C03C 21/00* (2006.01)

(52) U.S. Cl. .......................... 65/30.14; 65/61
(58) Field of Classification Search ........... 65/30.1, 65/30.13, 30.14, 60.1, 60.7, 111, 114, 116, 65/61

See application file for complete search history.

(56) References Cited

U.S. PATENT DOCUMENTS

| | | | |
|---|---|---|---|
| 5,654,057 A | 8/1997 | Kitayama et al. | |
| 5,725,625 A | 3/1998 | Kitayama et al. | |
| 5,916,656 A | 6/1999 | Kitayama et al. | |
| 6,119,483 A | 9/2000 | Takahashi et al. | |
| 6,134,918 A * | 10/2000 | Eto et al. | 65/30.14 |
| 6,427,489 B1 | 8/2002 | Eda et al. | |
| 6,430,965 B2 | 8/2002 | Eda et al. | |
| 6,523,367 B1 | 2/2003 | Ikeda et al. | |
| 6,534,120 B1 | 3/2003 | Ozawa et al. | |

\* cited by examiner

*Primary Examiner*—Steven P Griffin
*Assistant Examiner*—Queenie Dehghan
(74) *Attorney, Agent, or Firm*—Sughrue Mion, PLLC

(57) ABSTRACT

A magnetic disk glass substrate manufacturing method includes a step of polishing a surface of a glass substrate to a mirror surface, a gas heating process step of causing a heated atmosphere and the glass substrate to contact each other so as to heat the glass substrate at a temperature $T_0$, a step of causing a chemically strengthening salt melted exceeding a freezing temperature $T_F$ and the glass substrate to contact each other so as to chemically strengthen the glass substrate at a temperature $T_1$, a gas cooling process step of causing a gas coolant and the glass substrate to contact each other so as to cool the glass substrate to a temperature $T_2$, and a liquid cooling process step of causing a liquid coolant and the glass substrate to contact each other so as to cool the glass substrate to a temperature $T_3$, the above-mentioned steps being included in this order, wherein the temperature $T_2$ is set to a temperature less than the freezing temperature $T_F$ of the chemical strengthening salt in a gas cooling process.

6 Claims, 4 Drawing Sheets

RIBBING

MADE OF SUS316L    MADE OF SUS316L

MAGNETIC DISK GLASS SUBSTRATE MANUFACTURING METHOD

CROSS-REFERENCE TO RELATED APPLICATIONS

This application claims the benefit of U.S. Provisional Application No. 60/552,213 filed on Mar. 12, 2004.

BACKGROUND OF THE INVENTION

This invention relates to a method of manufacturing a glass substrate for a magnetic disk that is mounted in a magnetic disk apparatus such as a hard disk drive and a method of manufacturing a magnetic disk.

A magnetic disk device represented by a hard disk drive (HDD) can record a larger amount of information as compared with other information storages. Further, since the information transmission speed is high, it has rapidly been spreading. A recording medium installed in the hard disk drive is a magnetic disk, which is manufactured by depositing a magnetic layer, used as a magnetic recording layer, on a disk-shaped substrate.

In a hard disk drive, a magnetic head performs high-speed scanning over the surface of a magnetic disk rotating at high speed while keeping a narrow flying height. Thus, recording/reproduction of information is carried out.

As a substrate for a magnetic disk, use is made of a metal substrate of an aluminum alloy or the like, a resin substrate of plastics or the like, or a glass substrate. Since the glass substrate has a higher rigidity as compared with the substrates made of other materials, it is advantageously suitable for high-speed rotation of a disk and excellent in shock resistance. Further, since the glass substrate can be finished so as to have an extremely smooth mirror surface by carrying out precision polishing, it is possible to further narrow the flying height of a magnetic head. Therefore, use of the glass substrate can realize a high information recording density.

Glass is a brittle material as a raw material but is also a material that can be chemically strengthened. When glass is chemically strengthened, it is possible to generate a strong compressive stress on the surface. Therefore, by applying predetermined chemical strengthening to a glass substrate, a sufficient strength can be given thereto in terms of a use in a magnetic disk.

As a manufacturing method of such a magnetic disk glass substrate, techniques as described in, for example, U.S. Pat. Nos. 5,654,057, 5,725,625, and 5,916,656 are known.

On the other hand, in recent years, a magnetic head mounted with a magnetoresistive effect (MR Effect, Magneto-Resistive Effect) type reproducing element has been adopted for the purpose of increasing an information recording density recordable on a magnetic disk. It is known that when this MR effect type reproducing element is used, a recorded signal can be reproduced with a high S/N ratio, while, thermal asperity defect is liable to occur. When the thermal asperity defect occurs, the reproduction of the recorded signal is impeded. U.S. Pat. Nos. 6,119,483, 6,427,489, 6,430,965, 6,523,367, and 6,534,120 each disclose a manufacturing method of a magnetic disk glass substrate that can reduce occurrence of the thermal asperity defect.

Recently, even higher information recording capacities have been required. For example, there is demand for a magnetic disk that can record information of 60 GB or more per 2.5-inch magnetic disk (donut-shaped disk having an outer diameter of 65 mm and an inner diameter of 20 mm). Accordingly, there are required a magnetic disk and a magnetic disk glass substrate that can further improve the information recording density as compared with conventional ones.

Further, with respect to recent hard disk drives, the mobile type has been spreading in place of the conventionally used desktop type. Therefore, there are demand for a magnetic disk and a magnetic disk glass substrate that are excellent in shock resistance as compared with conventional ones.

Moreover, recently, for the purpose of increasing a recording/reproducing region per magnetic disk surface, further reducing the flying height of a magnetic head, and so on, a hard disk drive that performs a start/stop operation by the use of an LUL (Load Unload) system is now spreading in place of a hard disk drive that performs a start/stop operation by the use of a CSS (Contact Start Stop) system.

In the LUL system, while the hard disk drive is stopped, a magnetic head is retreated outside a magnetic disk surface and, at the time of starting, the magnetic head enters over the magnetic disk surface via a ramp and carries out recording/reproduction while flying. When the hard disk drive stops again, the magnetic head is retreated to the outside of the magnetic disk surface via the ramp.

In the LUL system, the magnetic head often interferes with the magnetic disk surface when the hard disk drive starts up. In order to relax such interference, it is preferable that the end portion shape of a magnetic disk glass substrate is controlled to a predetermined shape. By providing the predetermined end portion shape, it is also possible to increase a recording/reproducing region on the magnetic disk surface.

In addition, recently, it is required to provide a hard disk drive at an even reduced price.

SUMMARY OF THE INVENTION

It is therefore an object of this invention to provide a manufacturing method of a magnetic disk glass substrate and a manufacturing method of a magnetic disk, which can realize a high recording density and allow a recording/reproducing operation to be performed stably without failure.

A second object of this invention is to provide a manufacturing method of a magnetic disk glass substrate and a manufacturing method of a magnetic disk, which are excellent in shock resistance.

A third object of this invention is to provide a manufacturing method of a magnetic disk glass substrate and a manufacturing method of a magnetic disk, which are suitable for a use in a hard disk drive that performs a start/stop operation by the use of the load/unload (LUL) system.

A fourth object of this invention is to provide a manufacturing method of a magnetic disk glass substrate and a manufacturing method of a magnetic disk, which can be manufactured at low prices.

In order to achieve the foregoing objects, this invention has the following aspects.

(First Aspect)

A magnetic disk glass substrate manufacturing method according to a first aspect of this invention includes a step of polishing a surface of a glass substrate to a mirror surface, a gas heating process step of causing a heated atmosphere and the glass substrate to contact each other so as to heat the glass substrate at a temperature $T_0$, a step of causing a chemically strengthening salt melted exceeding a freezing temperature $T_F$ and the glass substrate to contact each other so as to chemically strengthen the glass substrate at a temperature $T_1$, a gas cooling process step of causing a gas coolant and the glass substrate to contact each other so as to cool the glass substrate to a temperature $T_2$, and a liquid cooling process step of causing a liquid coolant and the glass substrate to contact each other so as to cool the glass substrate to a temperature $T_3$, the steps being included in this order, wherein the temperature $T_2$ is set to a temperature less than the freezing temperature $T_F$ of the chemical strengthening salt in a gas cooling process.

(Second Aspect)

A magnetic disk glass substrate manufacturing method according to a second aspect of this invention, wherein: in the foregoing first aspect, the temperature $T_0$ for heating the glass substrate is set to a temperature higher than the freezing temperature $T_F$ of the chemically strengthening salt and lower than a temperature $T_d$ of a deformation point of the glass substrate in the gas heating process step.

(Third Aspect)

A magnetic disk glass substrate manufacturing method according to a third aspect of this invention, wherein: in the foregoing first aspect, the temperature $T_1$ for chemically strengthening the glass substrate is set to a temperature higher than the freezing temperature $T_F$ of the chemically strengthening salt and lower than a temperature $T_d$ of a deformation point of the glass substrate in the chemically strengthening step.

(Fourth Aspect)

A magnetic disk glass substrate manufacturing method according to a fourth aspect of this invention, wherein: in the foregoing first aspect, the glass substrate is cooled from the temperature $T_1$ to the temperature $T_F$ within 10 minutes in the gas cooling process and a cooling speed from the temperature $T_1$ to the temperature $T_F$ is set to 18° C. or more per minute in the gas cooling process.

(Fifth Aspect)

A magnetic disk glass substrate manufacturing method according to a fifth aspect of this invention, wherein: in the foregoing first aspect, the molten chemically strengthening salt used in the chemically strengthening step contains at least one selected from the group consisting of potassium ion, sodium ion, and lithium ion and the liquid coolant used in the liquid cooling process step is water.

(Sixth Aspect)

A magnetic disk manufacturing method according to a sixth aspect of this invention forms at least a magnetic layer on the glass substrate obtained by using the manufacturing method according to the foregoing first aspect.

(Seventh Aspect)

A magnetic disk glass substrate manufacturing method according to a seventh aspect of this invention includes a step of polishing a surface of a glass substrate to a mirror surface, a gas heating process step of causing a heated atmosphere and the glass substrate to contact each other so as to heat the glass substrate at a temperature $T_0$, a step of causing a chemically strengthening salt melted exceeding a freezing temperature $T_F$ and the glass substrate to contact each other so as to chemically strengthen the glass substrate at a temperature $T_1$, a gas cooling process step of causing a gas coolant and the glass substrate to contact each other so as to cool the glass substrate to a temperature $T_2$, and a liquid cooling process step of causing a liquid coolant and the glass substrate to contact each other so as to cool the glass substrate to a temperature $T_3$, the steps being included in this order, wherein the temperature $T_2$ is set to a temperature less than a boiling temperature $T_B$ of the liquid coolant used in a liquid cooling process.

DETAILED DESCRIPTION OF THE INVENTION

Figure 1:
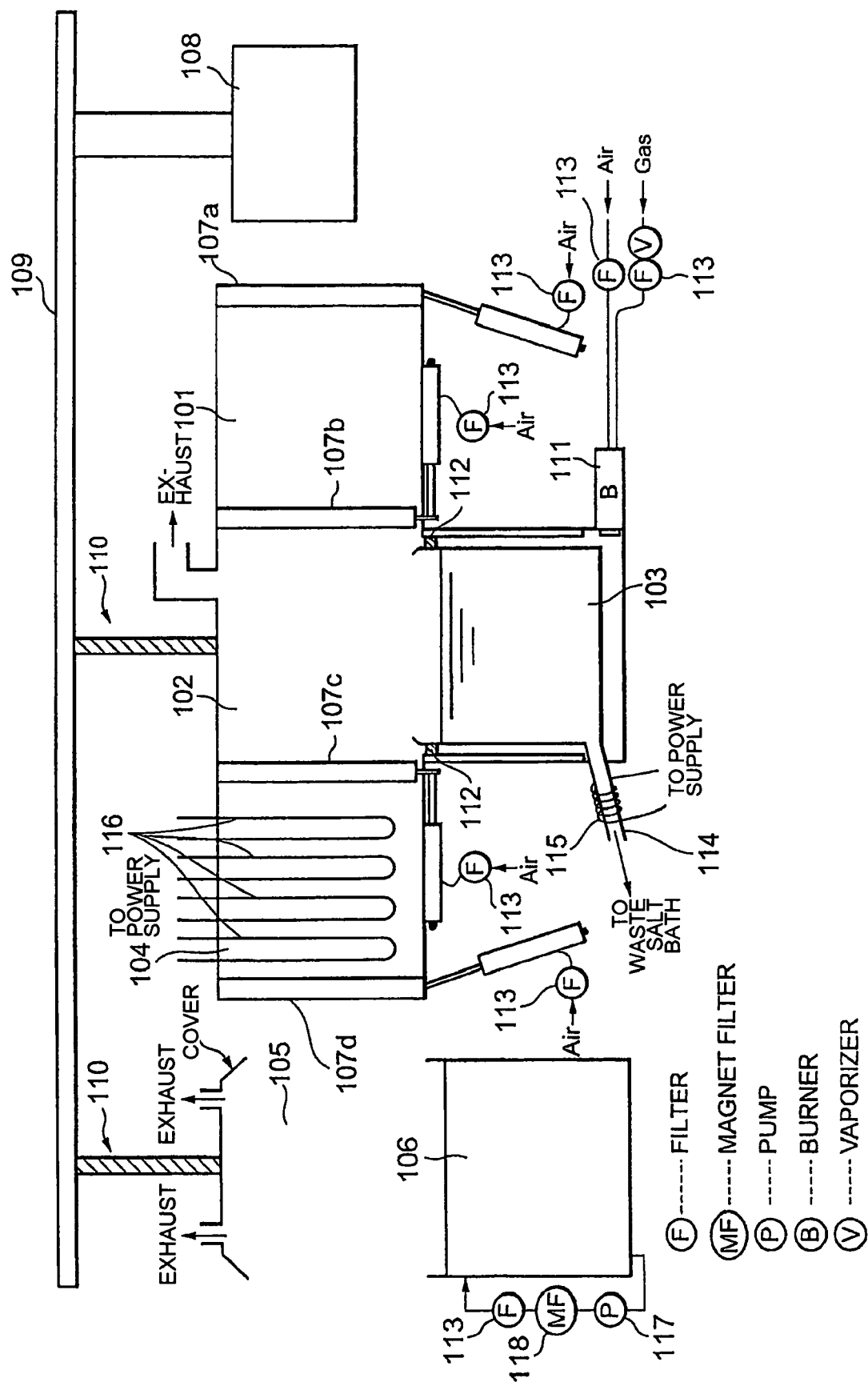
FIG. 1 is a sectional view showing a manufacturing apparatus for a magnetic disk glass substrate (chemically strengthening apparatus for a magnetic disk glass substrate), which is used in this invention.

In this invention, it is preferable to use amorphous glass as glass that forms a glass substrate. As a kind of glass, it is preferable to use aluminosilicate glass. As the aluminosilicate glass, aluminosilicate glass containing lithium as an alkali metal element is particularly preferable. With respect to such aluminosilicate glass, a preferable compressive stress, compressive stress layer, and tensile stress can be precisely obtained by an ion-exchange chemical strengthening method, particularly a low-temperature ion-exchange chemical strengthening method and therefore it is particularly preferable as a chemically strengthened glass substrate for a magnetic disk. As the aluminosilicate glass preferable in this invention, the glass preferably contains, as main components, $SiO_2$: 58 to 75 weight %, $Al_2O_3$: 5 to 23 weight %, $Li_2O$: 3 to 10 weight %, and $Na_2O$: 4 to 13 weight %. Further, the foregoing glass substrate is preferably aluminosilicate glass having a composition containing, as main components, $SiO_2$: 62 to 75 weight %, $Al_2O_3$: 5 to 15 weight %, $LI_2O$: 4 to 10 weight %, $Na_2O$: 4 to 12 weight %, and $ZrO_2$: 5.5 to 15 weight % wherein a weight ratio of $Na_2O/ZrO_2$ is 0.5 to 2.0 and a weight ratio of $Al_2O_3/ZrO_2$ is 0.4 to 2.5.

In order to prevent generation of projections on the surface of the glass substrate which are caused by undissolved substance of $ZrO_2$, use is preferably made of glass for chemical strengthening containing, in mol %, 57 to 74% of $SiO_2$, 0 to 2.8% of $ZnO_2$, 3 to 15% of $Al_2O_3$, 7 to 16% of $LiO_2$, and 4 to 14% of $Na_2O$, or the like. Such aluminosilicate glass is particularly preferable in this invention because it is suitable as aluminosilicate glass for chemical strengthening.

In a chemical strengthening method in this invention, for example, a glass substrate is brought into contact with heated and molten chemically strengthening salt so that ions in a surface layer of the glass substrate are exchanged for ions of the chemically strengthening salt. Although as ion exchange methods, a low-temperature ion exchange method, a high-temperature ion exchange method, a surface crystallization method, a glass surface dealkalization method, and so on are known, use is preferably made of the low-temperature ion exchange method that performs ion exchange in a temperature region not exceeding an annealing point. The low-temperature ion exchange method herein referred to is a method where, in a temperature region not higher than an annealing point of glass and not lower than a melting point of chemically strengthening salt, alkali metal ions (e.g. lithium ions, sodium ions, or the like) contained in the glass are replaced with alkali metal ions (e.g. sodium ions, potassium ions, or the like), having a larger ion radius, contained in the molten salt so that a compressive stress is generated in a surface layer of the glass due to increase in volume of ion-exchanged portions, thereby chemically strengthening the surface of the glass. Herein, the annealing point of glass is a temperature at which the internal strain of the glass is substantially removed in 15 minutes. The temperature of an annealing point of glass is measured by a fiber elongation method and the annealing point is a temperature corresponding to a glass viscosity of $10^{13}$ dPa.s (JIS R 3103-2:2001, ASTM C336-71).

As a material of the chemically strengthening salt in this invention, it is preferably a chemically strengthening salt material containing sodium nitrate and/or potassium nitrate. This is because when glass, particularly aluminosilicate glass, is chemically strengthened by the use of such chemically strengthening salt, a predetermined rigidity and shock resistance can be obtained as a chemically strengthened glass substrate for a magnetic disk.

As a material of a treatment bath used for chemical strengthening in this invention, it may be a material that is excellent in corrosion resistance with low dust generation. By selecting the material excellent in corrosion resistance as the material of the treatment bath, it is possible to suppress damage and dust generation to thereby suppress the thermal asperity defect and head crash. From this aspect, a quartz material is particularly preferable, but a stainless material, particularly a martensitic or austenitic stainless material that is excellent in corrosion resistance, is also preferable. Since the quartz material is excellent in corrosion resistance but expensive, selection may be properly made taking payability into account.

In this invention, the surface roughness of the main surface of the glass substrate is preferably such that the main surface is a mirror surface that can allow a magnetic head to stably perform a flying operation and prevent occurrence of thermal asperity. With respect to the surface roughness of the main surface, it is preferable that the main surface is a mirror surface having an arithmetic average roughness (Ra) of 0.5 nm or less and a maximum height (Rmax) of 5 nm or less when measurement is carried out by an atomic force microscope (AFM).

Since the glass substrate of this invention is excellent in shock resistance, it is particularly suitable as a glass substrate for a small-size magnetic disk for a mobile use. As such a magnetic disk glass substrate, use can be made of, for example, a glass substrate for a magnetic disk having an outer diameter of 65 mm or less and a disk thickness of 0.635 mm or less. For example, a glass substrate for a magnetic disk adapted to be installed in a 2.5-inch hard disk drive particularly suitable for a mobile use has an outer diameter of 65 mm and a disk thickness of 0.635 mm. A glass substrate for a magnetic disk adapted to be installed in a 1-inch hard disk drive has an outer diameter of 27.4 mm and a disk thickness of 0.381 mm.

The glass substrate of this invention is particularly suitable for a use of installation in a hard disk drive that performs a start/stop operation by the use of the load/unload system.

In this invention, there is provided a manufacturing method of a magnetic disk comprising at least a magnetic layer formed on a magnetic disk glass substrate. As the magnetic layer, use can be made of, for example, a CoPt-based ferromagnetic material. Further, a sputtering method can be used as a depositing method. A protection layer for protecting the magnetic layer can be deposited on the magnetic layer. As a material of the protection layer, amorphous carbon can be used. As a depositing method of the protection layer, use can be made of, for example, a plasma CVD method. Further, a lubrication layer for relaxing interference from a magnetic head can be formed on the protection layer. A perfluoropolyether compound can be used as a material of the lubrication layer. A dipping method can be used as a depositing method of the lubrication layer.

Hereinbelow, this invention will be described in detail by citing examples, but this invention is not limited to manners of those examples.

EXAMPLES 1 to 3

(Manufacture of Glass Substrate for Magnetic Disk)

A donut-shaped magnetic disk glass substrate made of amorphous aluminosilicate glass was manufactured. This aluminosilicate glass is glass for chemical strengthening containing lithium being an alkali metal element. This aluminosilicate glass has a composition of $SiO_2$: 63.6 weight %, $Al_2O_3$: 14.2 weight %, $Na_2O$: 10.4 weight %, $Li_2O$: 5.4 weight %, $ZrO_2$: 6.0 weight %, and $Sb_2O_3$: 0.4 weight %.

A manufacturing method of a magnetic disk glass substrate in this example includes (1) Rough Grinding Process, (2) Shape Processing Process, (3) Precision Grinding Process, (4) End Surface Mirror Finishing Process, (5) Main Surface Mirror Finishing Process, (6) Chemical Strengthening Process, and (7) Cleaning Process.

(1) Rough Grinding Process

Use was made of disk-shaped glass obtained from molten aluminosilicate glass having the foregoing composition and, by cutting it by the use of a grindstone, a glass disk having a diameter of 66 mm was obtained. Then, a grinding process was carried out for improving dimensional accuracy and shape accuracy of the main surfaces of the glass disk. This grinding process was performed by the use of a double-sided lapping machine using abrasive grains of grain size #400. Specifically, using first alumina abrasive grains of grain size #400, setting a load to about 100 kg, and rotating a sun gear and an internal gear, both main surfaces of the glass disk placed in a carrier were ground to a surface roughness Rmax of about 6 μm.

(2) Shape Processing Process

The shape processing process is an end surface grinding process for preparing an outer peripheral end surface and an inner peripheral end surface to the glass disk by the use of a grindstone.

A circular hole was formed at a center portion of the glass disk by the use of a cylindrical grindstone to form an inner peripheral end surface, thereby obtaining a donut shape. Further, an outer peripheral end surface was also processed for fine adjustment by the use of the grindstone.

Successively, predetermined chamfering was applied to the outer peripheral end surface and the inner peripheral end surface to thereby form chamfered surfaces. Abrasive grains of the grindstones used in the shape processing process had grain size of #400. The glass disk end surfaces were ground to a surface roughness Rmax of about 4 μm.

(3) Precision Grinding Process

By setting the grain size of abrasive grains to #1000 and lapping the main surfaces of the glass disk, the surface roughness of the main surfaces were set to about 2 μm by Rmax and about 0.2 μm by Ra. The glass disk after this precision grinding process was immersed in cleaning baths of neutral detergent and water in turn to carry out ultrasonic cleaning.

(4) End Surface Mirror Finishing Process

While spraying polishing slurry onto the end surfaces of the glass disk, a polishing brush with a shaft having nylon resin hair was brought into contact with the end surfaces of the glass disk and, by rotating the rotation shaft of the polishing brush and the glass disk in opposite directions, brush polishing of the end surfaces was carried out to perform mirror polishing. In this event, as free abrasive grains contained in the polishing slurry, use was made of cerium oxide abrasive grains having an average grain size of 1 μm. By this mirror polishing process, the end surfaces were polished to a mirror surface state and the surface roughness thereof was 30 nm by Ra.

(5) Main Surface Mirror Finishing Process

By the use of a double-sided polishing machine, a main surface mirror polishing process of the glass disk was carried out. In the double-sided polishing machine, the glass disk retained by the carrier was tightly interposed between upper and lower surface plates each having a polishing pad stuck thereto, then the carrier was meshed with a sun gear and an internal gear, and then the glass substrate was pressed by the upper and lower surface plates. Thereafter, polishing slurry was supplied between the polishing pads and the main surfaces of the glass disk and, through rotation of the gears, the glass disk revolved while rotating on its axis on the surface plates so that both surfaces were simultaneously polished. A retaining hole of the polishing carrier was formed by a member that gave no damage to the end surfaces of the glass disk.

As free abrasive grains contained in the polishing slurry, cerium oxide polishing abrasive grains were used. By reducing the average grain size stepwise, the main surfaces were finished to a high-quality mirror surface state. The main surfaces of the glass disk after the main surface mirror polishing process were analyzed and it was found that they were in the mirror surface state. The surface roughness was 0.5 nm by Ra and about 5 nm by Rmax.

(6) Chemical Strengthening Process (Apparatus Structure)

FIG. 1 shows a sectional view of a manufacturing apparatus for a magnetic disk glass substrate (chemically strengthening apparatus for a magnetic disk glass substrate), which is used in this invention.

This apparatus comprises a preheating portion 101, a heating portion 102, an ion exchange portion 103, an annealing portion 104 (first cooling portion), an open cooling portion 105 (second cooling portion), and a cooling portion 106 (third cooling portion). Further, as doors for separating these respective portions from each other, there are provided a door 107a for separating the open air and the preheating portion 101 from each other, a door 107b for separating the preheating portion 101 and the heating portion 102 from each other, a door 107c for separating the heating portion 102 and the annealing portion 104 from each other, and a door 107d for separating the annealing portion 104 and the open air from each other.

By the use of a conveyor 109, it is possible to move a work transfer basket 108 while retaining a glass substrate. During operation of the apparatus, the preheating portion 101, the heating portion 102, the ion exchange portion 103, and so on are exposed to high temperatures. Therefore, for members forming these portions, selection is made of a material having durability against high temperatures or temperature variation. Specifically, a stainless alloy is used. Among stainless alloys, use can be made of a martensitic stainless or an austenitic stainless. For example, there can be cited SUS316, SUS316L, or the like.

The work transfer basket 108 can be detached from the conveyor 109 and moved upward and downward by a drop lifter 110. The drop lifter 110 is provided with a cover for preventing oil and dust due to metal wear from scattering. When these scattered substances adhere to the glass substrate, they may impede ion exchange and cannot be removed. As a result, roughness is formed on the surfaces of the glass substrate and, therefore, when this glass substrate is used for a magnetic disk, the thermal asperity defect and head crash are caused thereby.

A gas burner 111 is used as heating means for the ion exchange portion 103. Exhaust gas of the gas burner 111 is introduced into the heating portion 102 via a filter 112 to heat an atmosphere of the heating portion 102. The reason for introducing the exhaust gas into the heating portion 102 via the filter 112 is to prevent dust and the like from inner walls of the ion exchange portion 103 and outer walls of a treatment bath of the ion exchange portion 103 from entering the heating portion 102 along with the introduction of the exhaust gas. If such dust and the like adhere to the glass substrate, they may impede ion exchange and cannot be removed. As a result, roughness is formed on the surfaces of the glass substrate and, therefore, when this glass substrate is used for a magnetic disk, the thermal asperity defect and head crash defect are caused thereby. As heating means for the ion exchange portion 103, it may also be a method of carrying out heating electrically. As means for heating, it may be any means as long as no dust or the like is generated by heating. For example, the ion exchange portion itself may be used as an electric furnace.

Further, part of the exhaust gas heated the atmosphere of the heating portion 102 further enters the preheating portion 101 and the annealing portion 104 to also heat atmospheres of the preheating portion 101 and the annealing portion 104. The gas burner 111 burns a gaseous mixture of propane gas and air. The fuel gas (propane gas) and the air for producing the gaseous mixture are subjected to a cleaning process through air filters 113 to thereby keep a cleanliness factor of the gaseous mixture at a predetermined level. This makes it possible to maintain a cleanliness factor within a gas pipe that leads the gaseous mixture to the gas burner 111 and prevent scattering of dust and the like from the exhaust gas of the gas burner 111. The preheating portion 101 and the heating portion 102 may be heated by the use of a heater without using the exhaust gas. For example, as a heater to be used, a quartz lamp heater, a stainless pipe, or the like can be exemplified. However, also in that case, it is necessary to provide a cover or the like for preventing scattering of dust and the like over a long-term use of the heater. Also in the case where such dust and the like adhere to the glass substrate, they may impede ion exchange and cannot be removed. As a result, roughness is formed on the surfaces of the glass substrate and, therefore, when this glass substrate is used for a magnetic disk, the thermal asperity defect and head crash are caused thereby. Although it is possible to preheat the glass substrate 31 in the heating portion 102 with no provision of the preheating portion 101, it is preferable that the preheating portion 101 be provided in consideration of the manufacturing efficiency in a mass-production factory. This is because, in a situation where substrates should be chemically strengthened in large quantities in the mass-production factory, it is expected that two or more work transfer baskets 108 are prepared to carry out chemical strengthening successively. In that case, since water vapor produced by the forward work transfer basket 108 upon entering the cooling portion 106 is scattered while adsorbing particles in the air, the glass substrate 31 loaded in the rearward work transfer basket 108 is often contaminated.

If this contaminated glass substrate 31 is used for a magnetic disk, the thermal asperity defect and head crash are caused thereby. In order to avoid this problem, if there is the preheating portion 101 that serves to cover the rearward work transfer basket 108 when the forward work transfer basket 108 enters the cooling portion 106 and further to efficiently carry out preheating, the foregoing contamination can be prevented by covering the rearward work transfer basket 108 when the forward work transfer basket 108 enters the cooling portion 106.

Figure 2:
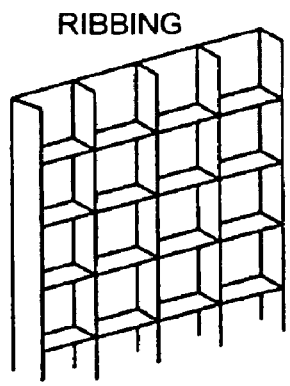
FIG. 2 is a sectional view showing a shape (lattice frame) of a treatment bath of an ion exchange portion.

In order not to damage the treatment bath of the ion exchange portion 103, it is configured such that a flame of the gas burner 111 does not directly contact the bath. Further, in order to enhance durability of the bath, lattice frames (ribs) are provided on wall surfaces of the bath to thereby improve the durability of the treatment bath (see FIG. 2). With this structure, the life of the treatment bath can be prolonged and, as a result, the production cost can be reduced. The lattice frames (see FIG. 2) may be provided on the inner walls and/or the outer walls of the bath.

Chemically strengthening salt for ion exchange can be put into the ion exchange portion 103. Further, the ion exchange portion 103 is provided with a waste pipe 114 for discarding the molten salt inside the ion exchange portion 103 and the waste pipe 114 is configured to be clogged with the solidified salt. When discarding the molten salt of the ion exchange portion 103, it can be discarded by energizing and heating a waste pipe heater 115 to thereby melt the solidified salt in the waste pipe 114. By the use of such a waste pipe 114, the production cost can be reduced.

The annealing portion 104 is provided with a pipe heater 116 (heater for an annealing chamber) at its inner walls so that the temperature of an atmosphere in the annealing portion 104 can be controlled. It is also necessary to provide this heater with a cover or the like for preventing scattering of dust and the like over a long-term use thereof. Also in the case where such dust and the like adhere to the glass substrate, the thermal asperity defect and the head crash defect are caused thereby. On the other hand, if the heater control is not necessary, for example, when slow cooling of the substrate temperature can be sufficiently controlled by leaving it standing in the atmosphere, the provision of the annealing portion 104 is not necessarily required.

Each of the doors 107a to 107d is opened and closed by an air cylinder using compressed air. The compressed air used was all subjected to a cleaning process through air filters 113. Such cleaning of the compressed air is also performed to prevent the thermal asperity defect and the head crash defect finally caused on a magnetic disk due to adhesion of dust and the like onto the glass substrate.

The open cooling portion 105 is configured as an open system so as to sufficiently contact the atmosphere having a heat capacity greater than that of the work transfer basket 108, and is further provided with an exhaust mechanism to thereby increase the cooling efficiency.

Polyvinyl chloride is used for the cooling portion 106 to produce a bath and water is used as a coolant. This water is circulated by a pump 117 to pass through a magnet filter 118 and a filter 113 so that the water as the coolant, which has been subjected to a cleaning process, is always supplied to the cooling portion. Such cleaning of the coolant is also performed to prevent the thermal asperity defect and the head crash defect finally caused on a magnetic disk due to adhesion of dust and the like onto the glass substrate. The flow rate of the pump 117 is set to a value that can circulate all the water in the bath in 5 minutes. The magnet filter 118 is provided for removing metal that adheres to a permanent magnet. Moreover, the filter 113 is provided for removing particles that do not adhere to the permanent magnet.

(Process)

Figure 3:
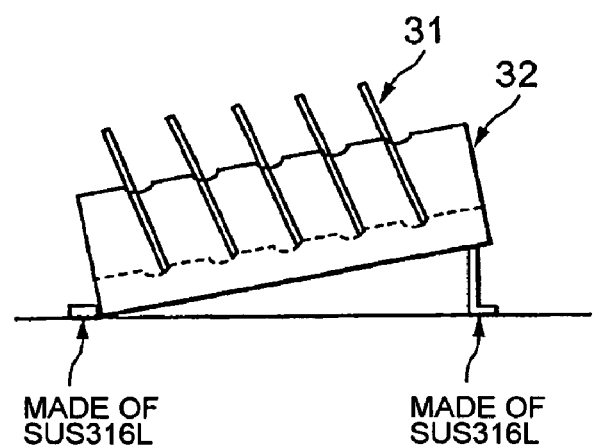
FIG. 3 is a sectional view showing the state where magnetic disk glass substrates are placed in a strengthening case while the strengthening case is disposed so as to be inclined with respect to the horizontal plane.

First, as shown in FIG. 3, magnetic disk glass substrates 31 were placed in a strengthening case 32 made of SUS316L. As a material of the strengthening case 32, use may also be made of, other than SUS316L, SUS316, Inconel, Hastelloy, Ti, or Ni. In this event, in order to prevent damage to the glass substrates 31 due to contact between the glass substrates 31 or between the glass substrates 31 and the strengthening case 32, the glass substrates 31 were placed in the strengthening case 32 in the state where the strengthening case 32 was retained so as to be inclined with respect to the horizontal plane.

Figure 4:
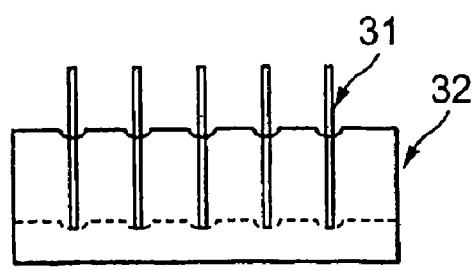
FIG. 4 is a sectional view showing the state where magnetic disk glass substrates are placed in a strengthening case while the strengthening case is disposed in a horizontal state.

In order to prevent occurrence of a difference in residual of the chemically strengthening molten salt on the two main surfaces of each of the glass substrates 31 after the chemical strengthening carried out in the ion exchange portion 103, the strengthening case 32 was disposed in the work transfer basket 108 in a horizontal state as shown in FIG. 4.

In order to prevent damage to the glass substrates 31 due to contact between the glass substrates 31 or between the glass substrates 31 and the strengthening case 32, the work transfer basket 108 was moved, through the preheating portion 101, to the heating portion 102 at a conveying speed of about 0.05 m per second to thereby increase the temperature of the glass substrates 31 and the strengthening case 32 in turn. In order to prevent damage to the glass substrates 31, the conveying speed of the work transfer basket 108 preferably falls within the range of 0.02 m to 0.10 m per second.

In the heating portion 102, the glass substrates 31 and the strengthening case 32 were heated to 260 to 300° C. This temperature was set no less than a freezing temperature $T_F$ of the chemically strengthening salt and no higher than a temperature $T_d$ of a deformation point of the glass substrate 31. The glass substrates 31 and the strengthening case 32 were configured so as to have the same temperature. The reason for this is to prevent in-plane unequal chemical strengthening applied to the glass substrates 31. When the in-plane unequal chemical strengthening occurs, waviness of the substrate increases. When the waviness of the substrate becomes greater than a desired value, not only head flying of an HDD becomes unstable, but also the thermal asperity defect and the head crash defect are caused thereby.

Herein, the freezing temperature $T_F$ of the chemically strengthening salt is a temperature at which the chemically strengthening salt reduces its temperature at a speed of 1° C./minute from a molten state (liquid phase state) and part of it in the molten state (liquid phase state) starts to be frozen. In the process where the chemically strengthening salt changes from its molten state (liquid phase state) to its solid phase state depending on its temperature, a temperature at which the molten strengthening salt starts to be frozen and a temperature at which the molten strengthening salt is completely frozen differ from each other, and the freezing temperature $T_F$ of the strengthening salt herein represents the temperature at which the molten strengthening salt starts to be frozen. In the case of the present examples 1 to 3, the freezing temperature $T_F$ is 250° C.

On the other hand, the temperature $T_d$ of the deformation point of the glass substrate is defined as a temperature at which, when a glass substrate having an outer diameter of 65 mm is kept at an arbitrary temperature for one hour, a variation in flatness starts to be 0.1 μm or more with respect to a flatness at the time of a room temperature. In the case of the present examples 1 to 3, the temperature $T_d$ of the deformation point is 350° C.

Herein, description will be given of waviness of a substrate. The waviness of the substrate is a kind of substrate surface profile and refers to a wavy shape having a period in the order of millimeters and an amplitude in the order of nanometers. When the period is smaller, it is called "roughness", while, when the period is greater, it is called "flatness". These "roughness", "waviness", and "flatness" are each a concept representing a profile of the surface of the substrate and there is no definite standard for demarcating them. On the actual glass substrate surface, unevenness whose period and amplitude are both in the order of angstroms (hereinafter referred to as "minimum unevenness") exists at random. An appearing manner of "minimum unevenness" taken in terms of a span in the order of micrometers is "roughness". The appearing manner of "minimum unevenness" is random in "roughness". However, observing it over a relatively long span, a certain periodicity is confirmed. This periodicity of the appearing manner of "minimum unevenness" is "waviness". Therefore, "waviness" can be said to be a tendency of the appearing manner of "minimum unevenness".

"waviness" is measured by an optical measuring device like "OPTI FLAT (trade name, produced by Phase Shift Company)". In the case of a glass substrate for a magnetic disk having a disk outer diameter of 65 mm, a disk inner diameter of 20 mm, and a disk thickness of 0.635 mm, there is calculated an average value of wavinesses having wavelengths of 200 nm to 5 mm in the whole substrate periphery in the range of radial positions (r) of 16.00 to 29.00 mm from the center of the disk.

The temperatures of the glass substrates 31 and the temperature of the strengthening case 32 were measured by the use of a radiation thermometer.

The strengthening case 32 with the glass substrates 31 disposed thereon was moved, along with the work transfer basket 108, to the ion exchange portion 103 by the use of the drop lifter 110. Then, chemical strengthening by ion exchange was carried out at 380° C. for 4 hours. Since the strengthening salt used for the chemical strengthening is required to have a melting point lower than a glass transition point ($T_g$) of the glass that is strengthened, use is made of nitrate or nitrite.

Herein, the glass transition point $T_g$ is a temperature at which glass transitions from a "glass state" (low temperature side) to a "supercooled liquid state" (high temperature side). Specifically, in a thermal expansion curve showing a relationship between a temperature and a glass sample, which is obtained by the use of a differential thermal dilatometer with in-furnace distribution temperatures within ±1° C. when the sufficiently annealed glass sample is heated at a constant speed of 4° C. per minute, the glass transition point is defined as a temperature corresponding to a point of intersection between extensions of linear portions (tangential lines) of a "glass state" (low temperature side) and a "supercooled liquid state" (high temperature side) (ISO 7884-8:1987, JIS R 3103-3:2001).

In the case of the present examples 1 to 3, the freezing temperature $T_F$ of the chemically strengthening salt is 250° C.

As the strengthening salt used in the chemical strengthening in this example 1, use was made of a mixture of 60 weight % of potassium nitrate and 40 weight % of sodium nitrate. Other than this, weight % of potassium nitrate may be changed in the range of 0 to 100 weight % and weight % of sodium nitrate may be changed in the range of 0 to 100 weight %. Further, lithium nitrate may be properly added to the mixed salt in the range of 0 to 5 weight %. The degree of chemical strengthening of the glass substrate 31 by ion exchange is determined based on the temperature and time of the chemical strengthening and the kind of chemically strengthening salt. For example, in the case of temperatures, times, and mixtures of chemical strengthening salts shown in Table 1, problem-free strengths in terms of shock resistance as the magnetic disk glass substrates 31 can be obtained.

However, it is necessary that the chemical strengthening temperature is set higher than the freezing temperature $T_F$ of the chemically strengthening salt and lower than the temperature $T_d$ of the deformation point of the glass substrate 31. The reason thereof is that when the chemical strengthening temperature is lower than the freezing temperature $T_F$ of the chemically strengthening salt, the state of the chemically strengthening salt becomes such that the molten salt and crystals mixedly exist, and therefore, in-plane unequal chemical strengthening is caused on the glass substrate 31. As a result, roughness or unevenness is formed on the surfaces of the glass substrate 31 due to the in-plane unequal chemical strengthening and, therefore, when this glass substrate 31 is used for a magnetic disk, the thermal asperity defect and the head crash defect are caused thereby.

On the other hand, when the chemical strengthening temperature is higher than the temperature $T_d$ of the deformation point of the glass substrate 31, deformation of the glass substrate 31 is caused thereby. When use is made of a mixture in which lithium nitrate is mixed to potassium nitrate and sodium nitrate, lithium nitrate is preferably 5 weight % or less and more preferably within the range of 0.5 weight % or more and 3 weight % or less. The reason thereof is that when mixing weight % of lithium nitrate is small, the ion exchange rate is very fast so that it becomes difficult to control a temperature and treatment time of chemical strengthening and a cooling process after the chemical strengthening. On the other hand, the reason is that when mixing weight % of lithium nitrate is large, the ion exchange rate is very slow so that sufficient strengthening cannot be achieved in terms of shock resistance of the glass substrate 31. For the same reasons, when use is made of the chemical strengthening salt in which lithium nitrate is mixed to potassium nitrate and sodium nitrate, the concentration of lithium ions is preferably set to 10 ppm or more and 2000 ppm or less.

TABLE 1

| Chemical Strengthening Temperature [° C.] | Chemical Strengthening Process Time [h] | Mixing Weight Ratio of potassium nitrate:sodium nitrate:lithium nitrate [weight %] |
|---|---|---|
| 340 | 2 | 60:40:0 |
| 340 | 4 | 60:40:0 |
| 340 | 4 | 59:39:2 |
| 380 | 2 | 60:40:0 |
| 380 | 2 | 59:39:2 |
| 380 | 4 | 60:40:0 |
| 380 | 4 | 59:39:2 |
| 380 | <u>4</u> | 58.5:38.5:3 |
| 380 | <u>4</u> | 57.5:37.5:5 |

After performing the chemical strengthening by ion exchange at 380° C. for 4 hours, the strengthening case 32 with the glass substrates 31 placed thereon was moved, along with the work transfer basket 108, to the heating portion 102 by the use of the drop lifter 110, thereby stopping the ion exchange.

Figure 5:
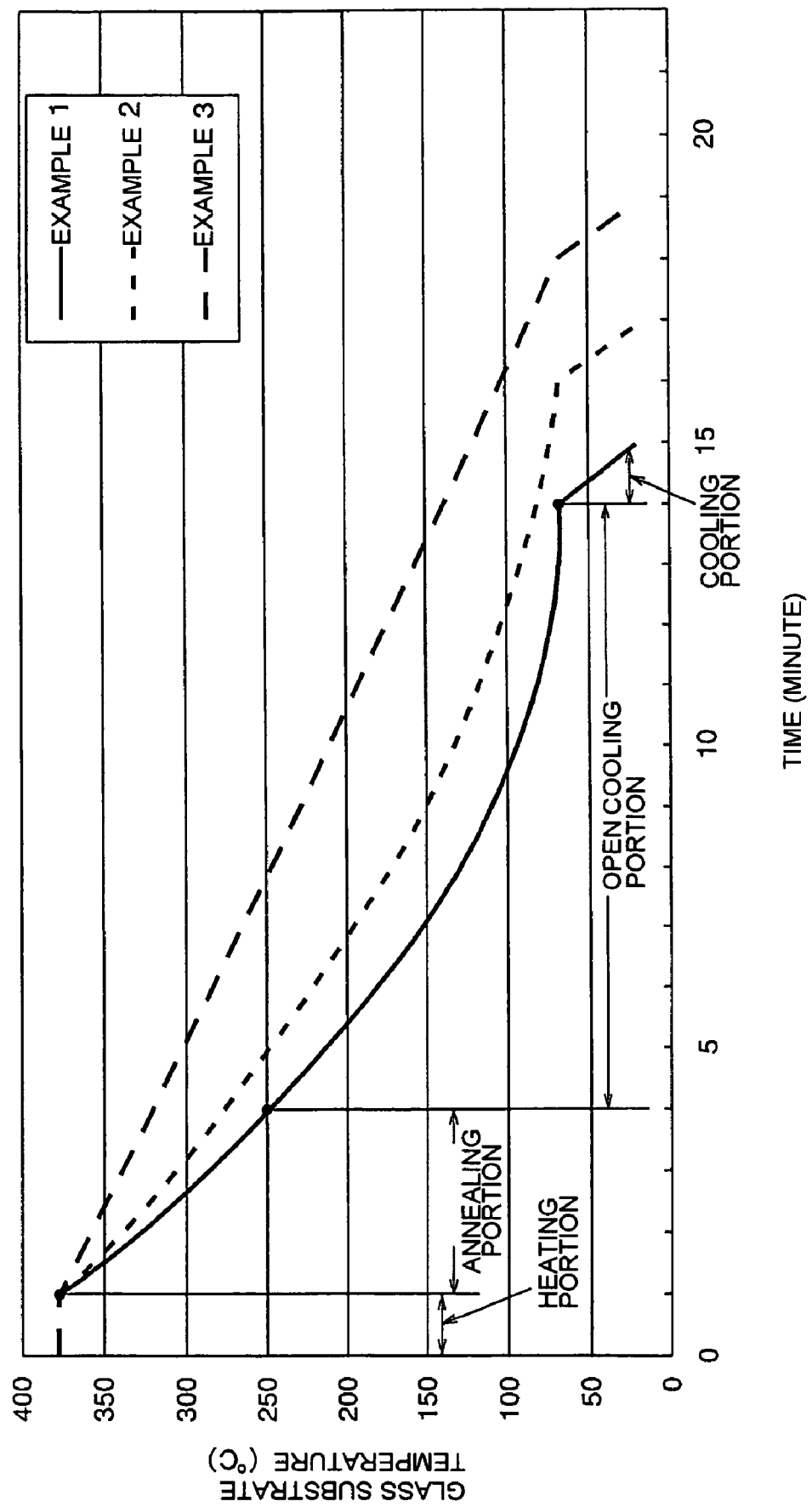
FIG. 5 is a graph showing cooling processes (time schedules) of glass substrates after chemical strengthening in Examples 1, 2, and 3.

The cooling process of the glass substrates 31 after the movement to the heating portion 102 was, as shown in FIG. 5, carried out according to a time schedule with the axis of ordinates represented by a glass substrate temperature (° C.) and the axis of abscissas represented by a time. For example, in a cooling process indicated by a solid line (Example 1) in FIG. 5, the strengthening case 32 with the glass substrates 31 placed thereon was left standing for 1 minute in the heating portion 102, then moved to the annealing portion 104 and left standing for 3 minutes while executing a temperature control. Thus, the glass substrates 31 was cooled to 250° C. (freezing temperature $T_F$ of chemically strengthening salt). Thereafter, the strengthening case 32 with the glass substrates 31 placed thereon was moved to the open cooling portion 105 and left standing for 10 minutes in the atmosphere having a sufficiently large heat capacity to thereby cool the glass substrates 31 to 70° C. Then, the strengthening case 32 with the glass substrates 31 placed thereon was moved, along with the work transfer basket 108, to the cooling portion 106 where water is used as a coolant, by the use of the drop lifter 110, thereby performing rapid cooling.

The time schedule of the cooling process for the glass substrates 31 after the movement to the heating portion 102 can be changed depending on the mixing ratio of chemically strengthening salt that is used for ion exchange of the glass substrates 31. For example, the chemically strengthening salt used in the cooling process indicated by the solid line (cooling process as described above) in FIG. 5 is the mixture of 60 weight % of potassium nitrate and 40 weight % of sodium nitrate. On the other hand, chemically strengthening salts used in cooling processes indicated by a dotted line (Example 2) and a broken line (Example 3) in FIG. 5 are respectively a mixture of 39 weight % of potassium nitrate, 59 weight % of sodium nitrate, and 2 weight % of lithium nitrate (Example 2) and a mixture of 37.5 weight % of potassium nitrate, 57.5 weight % of sodium nitrate, and 5 weight % of lithium nitrate (Example 3).

From FIG. 5, it is understood that, by increasing weight % of lithium nitrate, it is possible to prolong a time to cool the glass substrate 31 to the freezing temperature $T_F$ of the chemically strengthening salt in the annealing portion 104 and the cooling speed can also be reduced.

In the cooling process, it is preferable that the cooling of the glass substrate 31 in the annealing portion 104 be performed to the freezing temperature $T_F$ of the chemically strengthening salt within 10 minutes. Further, the cooling speed is preferably 18° C. or more per minute. The reason for this is that since the chemically strengthening salt adhered to the glass substrate 31 does not stop the ion exchange until it is completely solidified and crystallized, when the cooling time until the temperature of the glass substrate 31 in the annealing portion 104 reaches the freezing temperature of the chemically strengthening salt exceeds 10 minutes or when the cooling speed does not satisfy 18° C. or more per minute, in-plane unequal chemical strengthening is caused on the glass substrate 31. As a result, unevenness or roughness is formed on the surfaces of the glass substrate 31 due to the in-plane unequal chemical strengthening and, therefore, when this glass substrate 31 is used for a magnetic disk, the thermal asperity defect and the head crash defect are caused thereby.

Further, in the cooling process, it is preferable that the temperature of the glass substrate moved to the cooling portion 106 using the water as the coolant is set to a boiling point (100° C. in the case of water) or less of the coolant. The reason for this is as follows. If the glass substrate temperature is no less than the boiling point of the coolant when the glass substrate 31 contacts the coolant, vapor of the coolant is generated and, if this vapor adheres to the surfaces of the glass substrate 31 and is rapidly cooled without vaporization, spot-like or S-shaped concave portions are formed on the glass substrate 31. Accordingly, when this glass substrate 31 is used for a magnetic disk, the thermal asperity defect and the head crash defect are caused thereby.

(7) Cleaning Process

The glass substrate having finished the foregoing cooling process was immersed in sulfuric acid heated to about 40° C. and cleaning was performed while applying ultrasonic wave thereto. The glass substrate for a magnetic disk was manufactured in the manner as described above. The obtained glass substrate had an outer circumference diameter of 65 mm, an inner circumference diameter of 20 mm, and a substrate thickness of 0.635 mm.

It was confirmed to be a glass substrate for a magnetic disk suitable for installation in a 2.5-inch hard disk drive of the LUL system that is suitable for a mobile use.

Visual inspection and optical precision inspection utilizing reflection, scattering, and transmission of light were performed with respect to the surfaces of the obtained glass substrate. As a result, any defects such as projections, damages, cracks, or foreign matter were not found at all on the main surfaces and end surfaces of the glass substrate. Foreign matter that causes thermal asperity was also not found at all.

The main surfaces, the outer peripheral end surface, and the inner peripheral end surface of the obtained glass substrate were precisely analyzed by the use of an optical microscope, an electron microscope, and an atomic force microscope. As a result, they were in a clean mirror surface state and the surface roughness of the main surfaces, when measured by the atomic force microscope (AFM) was 4.8 nm by Rmax and 0.5 nm by Ra. Further, the surface roughness Ra of the end surfaces was 40 nm. Damages, fine cracks, or the like were not confirmed at all.

A strength test of the obtained glass substrate was performed. A steel ball having a diameter of 28.5 mm was placed at an inner diameter portion of the obtained magnetic disk glass substrate and then the steel ball was pushed down at a speed of 3 mm/minute while holding the outer periphery of the disk, thereby measuring a load upon breakage of the disk. As a result, the disk was not broken until a load of 15 kgf was applied thereto. It can be said that as the strength according to this test method is larger, the disk is more excellent in shock resistance.

By the use of the magnetic disk glass substrate thus manufactured, a magnetic disk was manufactured in the following manner.

Films were formed in order on this magnetic disk glass substrate by a DC magnetron sputtering method. First, a seed layer made of an AlRu alloy was formed on the glass substrate and then an underlayer made of CrW alloy was formed. The seed layer has a function of making finer magnetic grains of a magnetic layer, while the underlayer has a function of orienting an axis of easy magnetization of the magnetic layer in an in-plane direction.

Then, as the magnetic layer, a ferromagnetic layer of a CoCrPtB alloy was deposited. Subsequently, on this magnetic layer, a protection layer made of amorphous hydrogenated carbon was formed by a plasma CVD method. Successively, a lubrication layer made of a PFPE (perfluoropolyether) compound was formed by a dipping method. The magnetic disk was manufactured in the foregoing manner.

With respect to the obtained magnetic disk, an error inspection of a recording signal was performed under inspection conditions required when carrying out information recording of 100 Gbit/inch$^2$ corresponding to 60 Gbyte per magnetic disk. As a result, the thermal asperity defect or other recording/reproduction failure was not generated.

Further, a glide inspection was carried out and, even when the flying height of a glide head was 5 nm, contact with the surface of the magnetic disk was not confirmed. Further, a load/unload (LUL) durability test was performed. Excellent durability of 1,000,000 times or more was exhibited and therefore very high reliability can be achieved in a hard disk drive of the load/unload (LUL) system.

With respect to evaluation results about magnetic disk glass substrates and magnetic disks obtained under chemical strengthening process conditions and gas-liquid cooling process conditions in Examples 2 and 3, the results like in Example 1 were obtained.

Comparative Example 1

In Comparative Example 1, a magnetic disk glass substrate and a magnetic disk were obtained like in Example 1 except that the cooling speed from a temperature $T_1$ to the freezing temperature $T_F$ of the chemical strengthening salt in the gas cooling process was set to 61.9° C./minute and a temperature $T_2$ was set to 260° C. higher than the freezing temperature $T_F$ (250° C.) of the chemical strengthening salt.

With respect to the surfaces of the obtained glass substrate, visual inspection and optical precision inspection utilizing reflection, scattering, and transmission of light were performed like in Example 1. As a result, projections, damages, cracks, foreign matter, or the like were not found at all on the glass main surfaces and end surfaces in the visual inspection, while, in the optical precision inspection, projections, damages, cracks, foreign matter that causes thermal asperity, or the like were found on the glass main surfaces and end surfaces.

With respect to the main surfaces, the outer peripheral end surface, and the inner peripheral end surface of the obtained glass substrate, an analysis was precisely performed by the use of an electron microscope and an atomic force microscope like in Example 1. The roughness Rmax and Ra of the main surfaces and the surface roughness Ra of the end surfaces, when measured by the atomic force microscope, exhibited substantially the same values as the glass substrate obtained in Example 1. However, damages, fine cracks, or the like were found in the observation by the electron microscope.

A strength test of the obtained glass substrate was performed according to the same method as in Example 1. As a result, the disk was not broken until a load of 15 kgf was applied thereto.

Then, like in Example 1, an error inspection of a recording signal was performed with respect to the obtained magnetic disk under inspection conditions required when carrying out information recording of 100 Gbit/inch$^2$ corresponding to 60 Gbyte per magnetic disk. As a result, the thermal asperity defect and recording/reproduction failure were generated.

Further, a glide inspection like in Example 1 was performed. When the flying height of a glide head was 5 nm, contact with the surface of the magnetic disk was confirmed. Thus, it has been found that use cannot be made of a hard disk drive which is designed such that the flying height of a magnetic head is 5 nm or less. Moreover, a load/unload (LUL) durability test was performed. Durability of 100,000 times was exhibited and therefore it has been found that reliability is low in the case of a hard disk drive of the load/unload (LUL) system.

Comparative Example 2

In Comparative Example 2, a magnetic disk glass substrate and a magnetic disk were obtained like in Example 1 except that the cooling speed from a temperature $T_1$ (° C.) to the freezing temperature $T_F$ (° C.) of the chemical strengthening salt in the gas cooling process was set to 21.6° C./minute and a temperature $T_2$ was set to 110° C. higher than a boiling temperature $T_B$ of a liquid coolant (since the liquid coolant in Example 1 is water, $T_B$ in Example 1 is 100° C.).

With respect to the surfaces of the obtained glass substrate, visual inspection and optical precision inspection utilizing reflection, scattering, and transmission of light were performed like in Example 1 and, with respect also to the main surfaces, an outer peripheral end surface, and an inner peripheral end surface of the glass substrate, an analysis was precisely performed by the use of an electron microscope and an atomic force microscope like in Example 1. As a result, the results were the same as those in Comparative Example 1. Further, a strength test of the obtained glass substrate was performed according to the same method as in Example 1. As a result, the results were the same as those in Comparative Example 1.

Then, an error inspection of a recording signal, a glide inspection, and a load/unload (LUL) durability test were performed with respect to the obtained magnetic disk like in Example 1. The results were the same as those in Comparative Example 1.

Comparative Example 3

In Comparative Example 3, a magnetic disk glass substrate and a magnetic disk were obtained like in Example 1 except that the cooling time and the cooling speed from a temperature $T_1$ (° C.) to the freezing temperature $T_F$ (° C.) of the chemical strengthening salt in the gas cooling process were set to 11 minutes and 11.8° C./minute, respectively.

With respect to the surfaces of the obtained glass substrate, visual inspection and optical precision inspection utilizing reflection, scattering, and transmission of light were performed like in Example 1 and, with respect also to the main surfaces, an outer peripheral end surface, and an inner peripheral end surface of the glass substrate, an analysis was precisely performed by the use of an electron microscope and an atomic force microscope like in Example 1. As a result, the results were the same as those in Comparative Example 1. Further, a strength test of the obtained glass substrate was performed according to the same method as in Example 1. As a result, the results were the same as those in Comparative Example 1.

Then, an error inspection of a recording signal and a glide inspection were performed with respect to the obtained magnetic disk like in Example 1. The results were the same as those in Comparative Example 1. Further, a load/unload (LUL) durability test was performed. Durability of 300,000 times was exhibited and therefore it has been found that reliability is low in the case of a hard disk drive of the load/unload (LUL) system.

Comparative Example 4

In Comparative Example 4, a magnetic disk glass substrate and a magnetic disk were obtained like in Example 1 except that the temperature range of a temperature $T_0$ in the gas heating process was set to 400 to 450° C. higher than the temperature $T_d$ (350° C.) of the deformation point of the glass substrate being used, a temperature $T_1$ in the chemical strengthening process was set to 480° C. also higher than $T_d$, and the cooling speed from $T_1$ (° C.) to the freezing temperature $T_F$ (° C.) of the chemical strengthening salt in the gas cooling process was set to 28.8° C./minute.

With respect to the surfaces of the obtained glass substrate, visual inspection and optical precision inspection utilizing reflection, scattering, and transmission of light were performed like in Example 1 and, with respect also to the main surfaces, an outer peripheral end surface, and an inner peripheral end surface of the glass substrate, an analysis was precisely performed by the use of an electron microscope and an atomic force microscope like in Example 1. As a result, the results were the same as those in Comparative Example 1. Further, a strength test of the obtained glass substrate was performed according to the same method as in Example 1. As a result, the disk was not broken until a load of 20 kgf was applied thereto.

Then, an error inspection of a recording signal and a glide inspection were performed with respect to the obtained magnetic disk like in Example 1. The results were the same as those in Comparative Example 1. Further, a load/unload (LUL) durability test was performed. Durability of 500,000 times was exhibited and therefore it has been found that reliability is low in the case of a hard disk drive of the load/unload (LUL) system.

Figure 6:
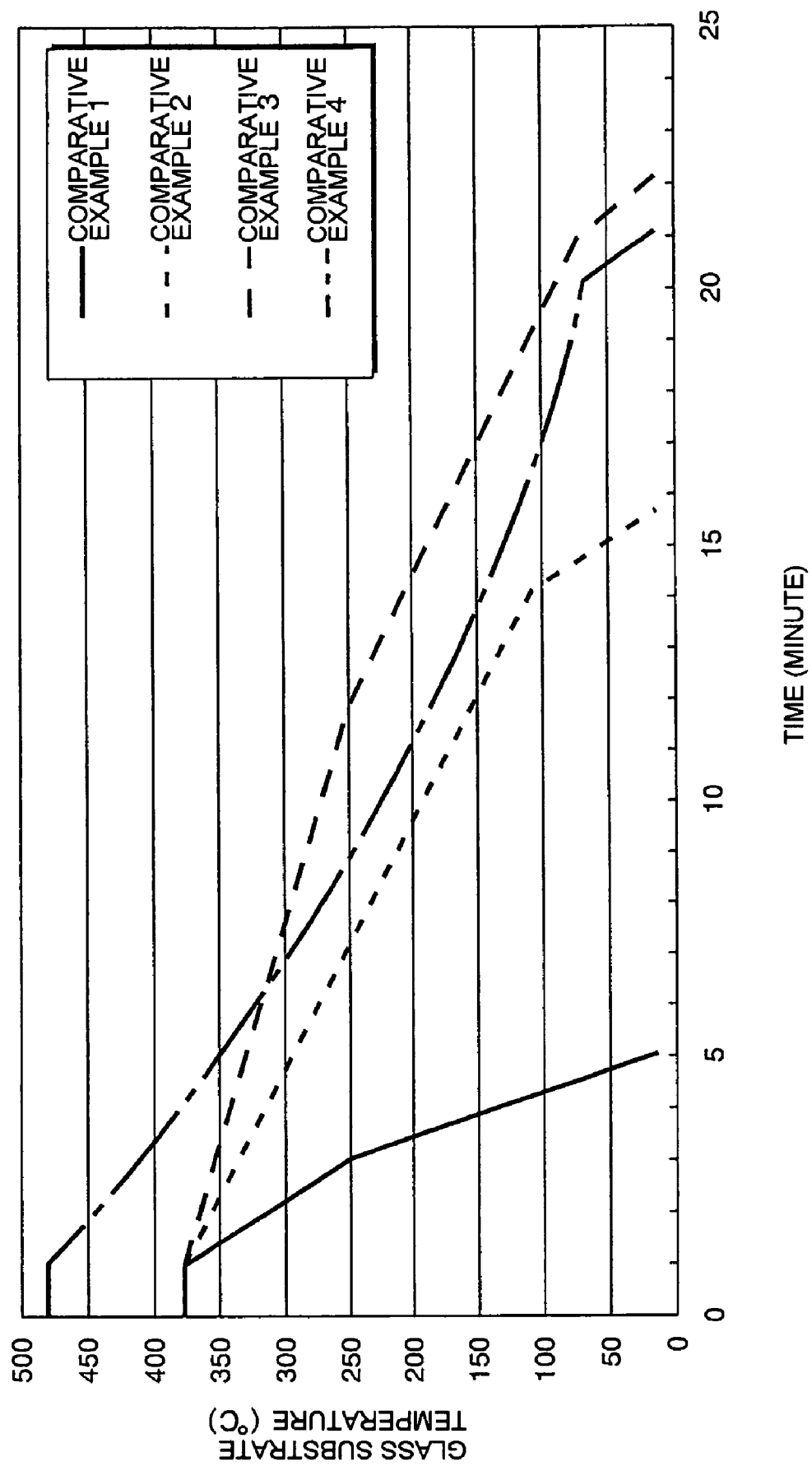
FIG. 6 is a graph showing cooling processes (time schedules) of glass substrates after chemical strengthening in Comparative Examples 1, 2, 3, and 4.

Cooling processes of the glass substrates 31 after moving to the heating portion 102 in Comparative Examples 1 to 4 are identified by time schedules each having the axis of ordinates represented by a glass substrate temperature (° C.) and the axis of abscissas represented by a time, as shown in FIG. 6.

Table 2 shows the gas heating process temperatures $T_0$ (° C.), the chemical strengthening process temperatures $T_1$ (° C.), the times (minute) and cooling speeds (° C./minute) from $T_1$ (° C.) to the freezing temperature $T_F$ (° C.) of the chemical strengthening salt in the gas cooling process, $T_2$ (° C.) in the gas cooling process, and $T_3$ (° C.) in the liquid cooling process in Examples 1 to 3 and Comparative Examples 1 to 4, respectively.

TABLE 2

|  | Gas Heating Process $T_0$ (° C.) | Chemical Strengthening Process $T_1$ (° C.) | Gas Cooling Process | | | Liquid Cooling Process $T_3$ (° C.) |
|---|---|---|---|---|---|---|
|  |  |  | Time for Cooling from $T_1$ to $T_F$ (min) | Cooling Speed for Cooling from $T_1$ to $T_F$ (° C./min) | $T_2$ (° C.) |  |
| Example 1 | 260-300 | 380 | 3 | 43.3 | 70 | 20 |
| Example 2 | 260-300 | 380 | 4 | 32.5 | 70 | 20 |
| Example 3 | 260-300 | 380 | 7 | 18.6 | 70 | 20 |
| Comparative Example 1 | 260-300 | 380 | 2.1 | 61.9 | 260 | 20 |
| Comparative Example 2 | 260-300 | 380 | 6 | 21.6 | 110 | 20 |
| Comparative Example 3 | 260-300 | 380 | 11 | 11.8 | 70 | 20 |
| Comparative Example 4 | 400-450 | 480 | 8 | 28.8 | 70 | 20 |

Further, Table 3 shows the evaluation results about the magnetic disk glass substrates and the magnetic disks obtained in Examples 1 to 3 and Comparative Examples 1 to 4, respectively.

TABLE 3

|  | Substrate Main Surface Inspection | | Substrate Main Surface/End Surface Inspection | | Substrate Breaking | | Recording/ | | |
|---|---|---|---|---|---|---|---|---|---|
|  | Visual Inspection | Optical Precision Inspection | SEM Analysis | AFM Analysis | Load (kgf) | Thermal Asperity | ReproDuction Failure | Glide Inspection | LUL Durability |
| Example 1 | OK | OK | OK | OK | 15 | No | No | OK | 1,000,000 Times or More |
| Example 2 | OK | OK | OK | OK | 15 | No | No | OK | 1,000,000 Times or More |
| Example 3 | OK | OK | OK | OK | 15 | No | No | OK | 1,000,000 Times or More |
| Comparative Example 1 | OK | NG | NG | OK | 15 | Yes | Yes | NG | 100,000 Times |
| Comparative Example 2 | OK | NG | NG | OK | 15 | Yes | Yes | NG | 100,000 Times |
| Comparative Example 3 | OK | NG | NG | OK | 15 | Yes | Yes | NG | 300,000 Times |
| Comparative Example 4 | OK | NG | NG | OK | 20 | Yes | Yes | NG | 500,000 Times |

What is claimed is:

1. A magnetic disk glass substrate manufacturing method comprising:
   a step of polishing a surface of a glass substrate to a mirror surface;
   a step of chemically strengthening the glass substrate by causing a chemical strengthening salt and the glass substrate to contact each other in a heated atmosphere so as to chemically strengthen the glass substrate at a temperature $T_1$;
   a gas cooling process step of causing a gas coolant and the glass substrate to contact each other so as to cool the glass substrate to a temperature $T_2$;
   a liquid cooling process step of causing a liquid coolant and the glass substrate to contact each other so as to cool the glass substrate to a temperature $T_3$;
   the steps being included in this order,
   wherein in said gas cooling process step, the glass substrate is cooled from the temperature $T_1$ to a freezing temperature $T_F$ of the chemical strengthening salt within 10 minutes and a cooling speed from the temperature $T_1$ to the freezing temperature $T_F$ is set to 18° C. or more per minute,
   wherein in said gas cooling process step, the temperature $T_2$ is set to a temperature less than a boiling temperature $T_B$ of the liquid coolant used in the liquid cooling process,
   wherein in said gas cooling process step, the temperature $T_2$ is set to a temperature less than the freezing temperature $T_F$ of the chemical strengthening salt, and
   wherein in said gas cooling process step, the glass substrate is cooled from the freezing temperature $T_F$ to the temperature $T_2$.

2. A magnetic disk glass substrate manufacturing method according to claim 1, further comprising:
   a gas heating process step of subjecting the glass substrate to a heated atmosphere so as to heat the glass substrate at a temperature $T_0$;
   wherein in the gas heating process step, the temperature $T_0$ for heating the glass substrate is set to a temperature higher than the freezing temperature $T_F$ of the chemically strengthening salt and lower than a temperature $T_d$ of a deformation point of the glass substrate.

3. A magnetic disk glass substrate manufacturing method according to claim 1, wherein:
   in the chemically strengthening step, the temperature T1 for chemically strengthening the glass substrate is set to a temperature higher than the freezing temperature TF of the chemically strengthening salt and lower than a temperature Td of a deformation point of the glass substrate.

4. A magnetic disk glass substrate manufacturing method according to claim 1, wherein:
   the chemically strengthening salt used in the chemically strengthening step is in a molten state and contains at least one selected from the group consisting of potassium ion, sodium ion, and lithium ion and the liquid coolant used in the liquid cooling process step is water.

5. A method of manufacturing a magnetic disk having at least a magnetic layer formed on the glass substrate manufactured by the manufacturing method according to claim 1.

6. A magnetic disk glass substrate manufacturing method comprising in order:
   a step of polishing a surface of a glass substrate to a mirror surface;
   a step of chemically strengthening the glass substrate by causing a chemical strengthening salt and the glass substrate to contact each other in a heated atmosphere so as to chemically strengthen the glass substrate at a temperature $T_1$;
   a gas cooling process step of causing a gas coolant and the glass substrate to contact each other so as to cool the glass substrate to a temperature $T_2$;
   a liquid cooling process step of causing a liquid coolant and the glass substrate to contact each other so as to cool the glass substrate to a temperature $T_3$;
   wherein in said gas cooling process step, the glass substrate is cooled from the temperature $T_1$ to a freezing temperature $T_F$ of the chemical strengthening salt within 10 minutes and a cooling speed from the temperature $T_1$ to the freezing temperature $T_F$ is set to 18° C. or more per minute,
   wherein in said gas cooling process step, the temperature $T_2$ is set to a temperature less than a boiling temperature $T_B$ of the liquid coolant used in the liquid cooling process,
   wherein in said gas cooling process step, the temperature $T_2$ is set to a temperature less than the freezing temperature $T_F$ of the chemical strengthening salt,
   wherein in said gas cooling process step, the glass substrate is cooled from the freezing temperature $T_F$ to the temperature $T_2$, and
   wherein in said gas cooling process step, the glass substrate is cooled from the freezing temperature $T_F$ to the temperature $T_2$ within 10 minutes to 11 minutes.

* * * * *